United States Patent [19]

Sakanaka

[11] 4,112,729

[45] Sep. 12, 1978

[54] COUPLING DEVICE OF OIL FEEDING PIPE FOR ROLLING MILL

[75] Inventor: Takao Sakanaka, Hitachi, Japan

[73] Assignee: Hitachi, Ltd., Tokyo, Japan

[21] Appl. No.: 823,748

[22] Filed: Aug. 11, 1977

[30] Foreign Application Priority Data

Aug. 25, 1976 [JP] Japan .................................. 51/100543

[51] Int. Cl.² ........................ B21B 27/06; B21B 31/08
[52] U.S. Cl. ........................................ 72/236; 72/238
[58] Field of Search .................. 72/236, 237, 238, 200, 72/239

[56] References Cited

U.S. PATENT DOCUMENTS

| | | | |
|---|---|---|---|
| 2,159,337 | 5/1939 | McBain | 72/236 |
| 3,406,552 | 10/1968 | Krauss et al. | 72/236 |

Primary Examiner—Milton S. Mehr
Attorney, Agent, or Firm—Beall & Jeffery

[57] ABSTRACT

Coupling for piping for a roll chock in a rolling mill, which allows quick exchange of rolls and automatic coupling of piping in the roll chock for supplying lubricating oil. In this rolling mill, male and female tubular couplings are secured to a roll chock, and to a mill housing, respectively, so that the male and female tubular couplings may be engaged with or disengaged from each other only by displacing the roll assembly in its axial direction.

12 Claims, 11 Drawing Figures

| 4,112,729

COUPLING DEVICE OF OIL FEEDING PIPE FOR ROLLING MILL

LIST OF PRIOR ART REFERENCES

The following references are cited to show the state of the art:

Japanese Patent Publication No. Sho. 48-33310 Kohji Nishimoto Oct. 31, 1969

Japanese Patent Publication No. Sho. 48-21714 Nobuo Ida et al Nov. 27, 1969

BACKGROUND OF THE INVENTION

This invention relates to coupling for piping in a bearing-portion for a roll chock in a rolling mill, and more particularly to the coupling for joint in a bearing portion for a roll chock, which is best suited for a rolling mill permitting the exchange of rolls only by displacing the roll assembly composed of a roll and roll chocks provided on each end of the roll, back and forth, in the axial direction of the roll.

In general, a bearing portion which bears a rotating roll for use in rolling operation is housed in a roll chock, while a lubricating oil is fed to a bearing-portion for a roll through the medium of a roll chock for the roll. The roll chock is built in a mill housing, and should be moved up and down within the mill housing during the rolling operation. Meanwhile, the mill housing should be replaced by another roll assemblies, several times a day. In such a case, the roll chock should be drawn towards the driven (operator's side) or driving side, as required.

Accordingly, the coupling for piping in a roll chock should fulfill the following requirements:

(1) Easy attachment and removal, i.e., engagement and disengagement. Light weight and a minimized space to be occupied.

(2) Feasibility of upward and downward movements.

(3) Inner diameter adapted for a desired flow rate of a fluid flowing through the piping.

(4) Strength high enough for a pressure required and ease of handling.

The attempts which have been proposed hitherto for couplings for piping in a bearing portion for a roll chock are: (i) quick couplings which may be attached or removed manually, on both the driven side (operator's side) and driving side; (ii) a combination of quick couplings used on the driven side, and a pipe or hose connected from a driving-side roll chock to a driven-side roll chock, so that a lubricating oil is supplied from the driven side; (iii) couplings provided on a member or body such as a wheeled platform or truck, which may be separated from a roll after the drawal of a roll, so that couplings may be automatically engaged with each other, simultaneously with the exchange of rolls (Japanese Patent Publication No. Sho. 48-33310).

However, the aforesaid prior art couplings suffer from various disadvantages. In other words, in the former case, an operator should go to the driving side to attach and remove the couplings. However, the driving side provides poor operationability because of a limited space, in which there are positioned a spindle for driving a roll and carriers for holding the spindle. In addition, according to an attempt utilizing pipes and the like, limitations are imposed on a space for the attaching and removing operation of pipes or a space for a foothold. Furthermore, according to an attempt utilizing couplings provided on a member or body such as wheeled platform which is to be separated from a roll, there results complexity in construction for roll exchange as well as in roll-exchange operation, so that a limitation is imposed on the quick exchange of rolls. In other words, this has been a formidable task to enable the complete automation of roll-exchange operation.

SUMMARY OF THE INVENTION

It is an object of the present invention to provide couplings for piping in a roll chock in a rolling mill, which allows automatic coupling of piping in a roll chock for supplying and exhausting lubricating oil to the roll chock, only by moving the roll assembly back and forth in the axial direction of the roll, with a tubular coupling having a pair of tubular members provided at least one of driving and driven side being in liquid sealing engagement to supply and exhaust lubricating oil to and from the roll chocks, one of the tubular member provided on the roll chock and the other provided on a guide member slidably mounted on the mill housing in such a manner that the tubular members are capable to move in response to vertical movement of the roll assembly, and the tubular member coaxially positioned to couple upon exchange of the roll assembly.

It is another object of the present invention to provide tubular couplings, which allow easy, automatic exchange of rolls.

DETAILED DESCRIPTION OF THE PREFERRED EMBODIMENTS

These and other objects and features of the invention will be apparent from a reading of the ensuring part of the specification in conjunction with the accompanying drawings which indicate embodiments of the invention.

Figure 1:
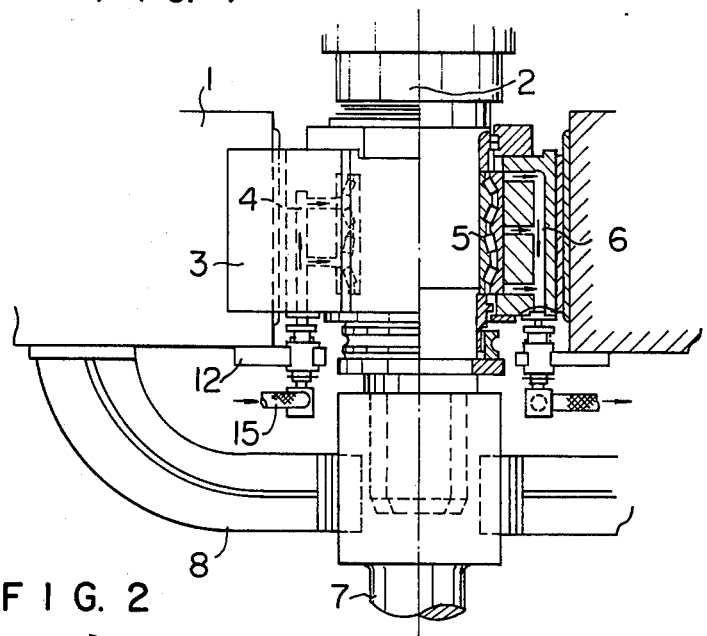
FIG. 1 is a plan view showing an embodiment of coupling for piping in a bearing portion for a roll chock in a rolling mill according to the present invention.
Figure 2:
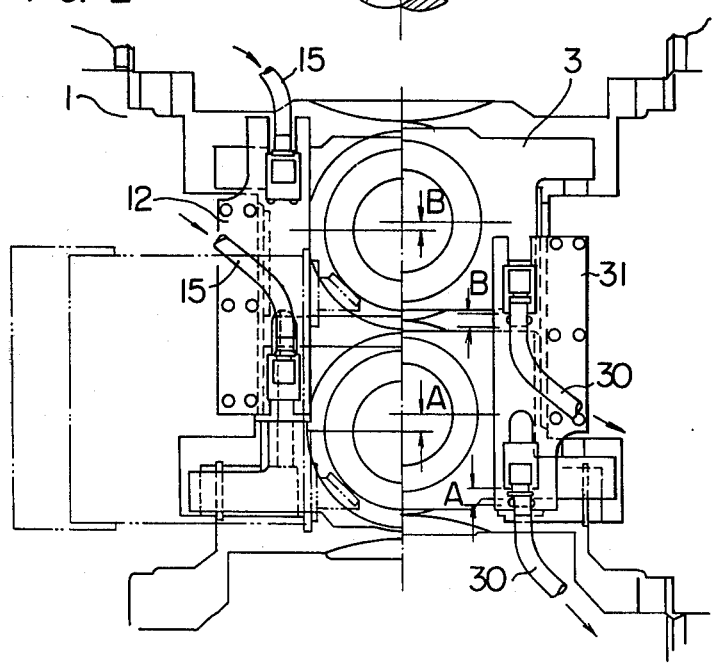
FIG. 2 is a front view showing positions of a lower roll and an upper roll upon exchange of rolls, and the position thereof during the rolling operation.
Figure 3:
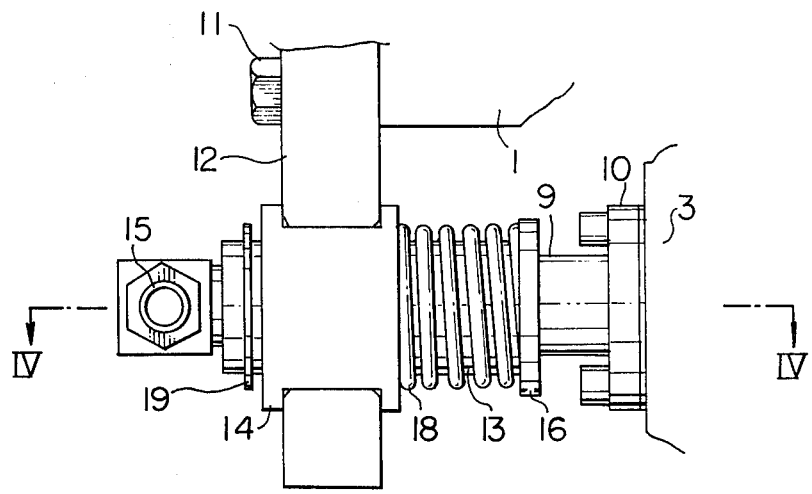
FIG. 3 is an enlarged, plan veiw of an essential port of the embodiment of FIG. 1.
Figure 4:
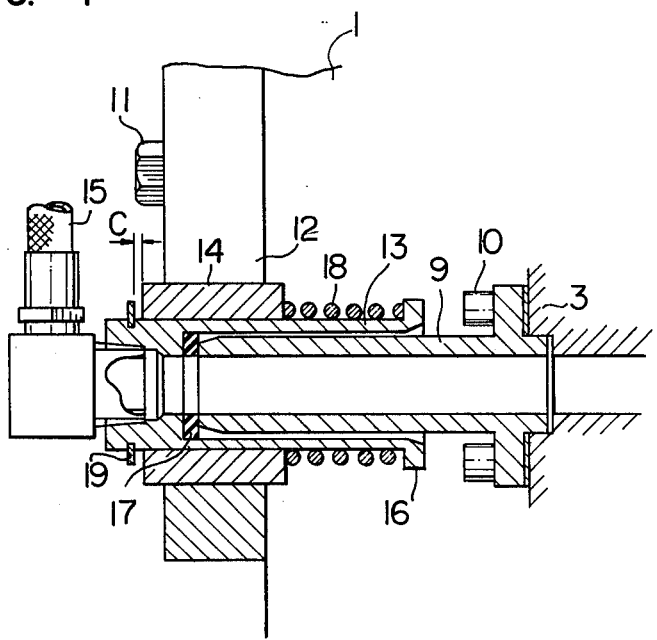
FIG. 4 is a cross-sectional view taken along the line IV—IV of FIG. 3.

The embodiments shown in FIGS. 1 to 6 refer to the case of a rolling mill, in which rolls are exchanged from a driven side. Shown at 1 in FIGS. 1 and 2 is a driving-side roll housing, by which a roll chock 3 for a roll is supported on the driving side of a roll. Provided within the driving-side roll chock 3 for a roll are a bearing 5, which rotatably supports an end portion of the roll 2, an a fluid passage 6 through which to supply a lubricating oil to the bearing 5. Shown at 7 in FIG. 1 is a spindle, and at 8 a spindle carrier. As shown in FIGS. 3 and 4, a first tubular coupling 9 communicating with the fluid passage 6 is secured to the roll chock 3 for a roll by means of bolts 10 and the like. The first tubular coupling 9 constitutes a male coupling. A guide 12 is secured to the driving-side mill housing 1 by means of bolts 11 and like, and is formed with a cut-away portion elongated in the vertical direction, which portion is adapted to guide or receive a second tubular coupling 13 and a slider 14 to be described later. The slider 14 is of a cylindrical shape and directly held by the guide 12, while the slider 14 slidably holds the second tubular coupling 13 in the axial direction on the inner peripheral surface of the slider 14. The second tubular coupling 13 constitutes a female coupling to be coupled to the first male tubular coupling 9, and is substantially of a cylindrical shape, while a lubricating oil supply hose 15 is connected to the outer end of the second tubular coupling 13. The inner diameter of a bore in the second tubular coupling 13 is relatively large in a range from the center thereof to the right in FIG. 4, while the inner end of the coupling 13, i.e., the end of the coupling 13 which is adapted to be opposed to the first tubular coupling 9 is formed with a flange portion 16. Provided at the end of the bore having a relatively large diameter in the second tubular coupling 13, i.e., to the left-hand end thereof is a rubber packing 17. A spring 18 is confined between the flange portion 16 of the second tubular coupling 13 and the slider 14, so that the second tubular coupling 13 is spring-loaded so as to be biased towards the first tubular coupling 9. A stopper 19 is integrally formed with the outer periphery of the second tubular coupling 13 outwardly of the slider 14, i.e., to the left in the drawing, so that the second tubular coupling 13 is locked by the slider 14 by the medium of the stopper 19.

The aforesaid arrangement is provided in a dual relation as shown in FIG. 2. Shown at 30 is an oil outlet hose, and at 31 a guide, respectively. The positions of rolls 2 vary, depending on whether the rolls remain in their exchanged or unloaded positions or in their rolling positions. The reference characters A and B represent distances between the exchanged or unloaded positions and the rolling positions of upper and lower rolls, respectively.

Figure 5:
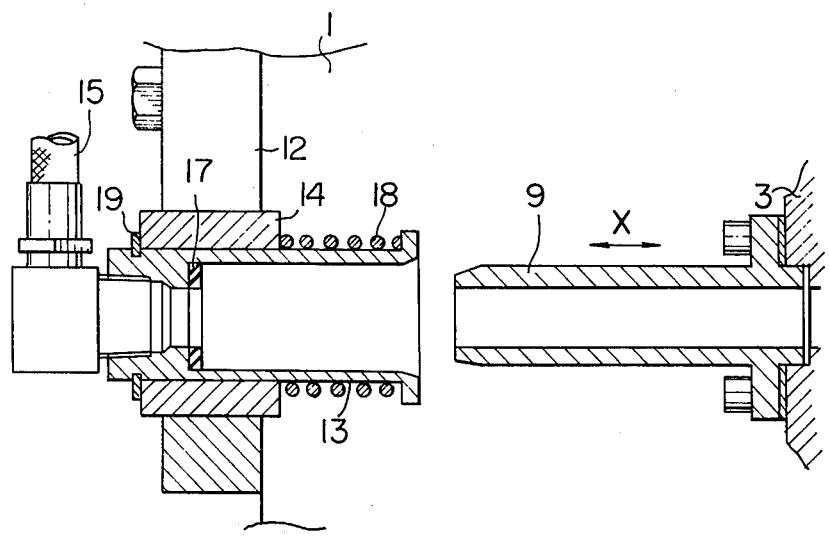
FIGS. 5 and 6 are cross-sectional views illustrative of an operating condition of the embodiment of FIG. 1, with the positions of members being similar to those shown in FIG. 4.

Description will now be given of the operation of the couplings for piping. FIG. 5 shows a condition where the first tubular coupling 9 is separated from the second tubular coupling 13 upon exchange of rolls. In this respect, the female coupling consisting of the first tubular coupling 13 and sleeve 14 is positioned in the lowermost position relative to the guide 12. At this time, the second tubular coupling 13 is brought into axial alignment with the first tubular coupling 9 on the male side, when the roll is positioned in the lowermost position, as viewed in the vertical direction, upon exchange of rolls.

After exchange of rolls, when a roll is positioned properly in the mill housing, as shown in FIG. 4, the first tubular coupling 9 is inserted into the second tubular coupling 13 in a manner to bias the second tubular coupling 13 a distance C outwardly, through the medium of the rubber packing 17. Accordingly, both a rightward biasing force of the second tubular coupling 13 by means of the spring 18 and an action of the rubber packing 17 cause the both tubular coupling 9, 13 to be coupled intimately.

Figure 6:
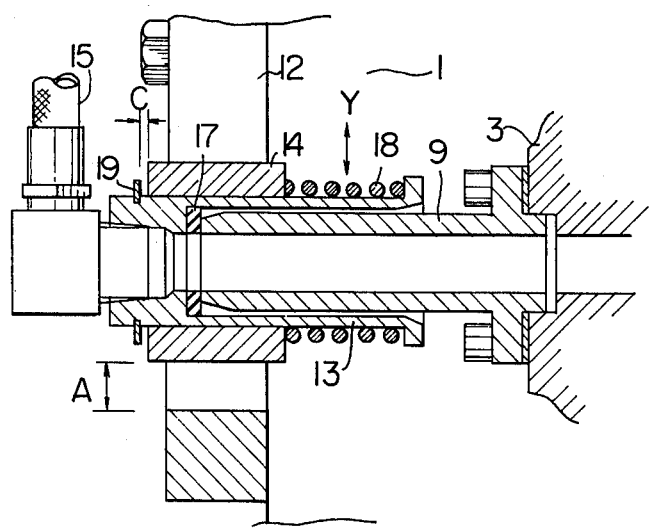

FIG. 6 shows a rolling condition. The roll is normally pushed upwards by means of a hydraulic cylinder not shown, so that the first tubular coupling integral with the roll is pushed upwards, and then the tubular coupling 13 and slider 14 are pushed upwards a distance A as shown in FIG. 6, along with the first tubular coupling 9, being guided by the guide 12. In otherwords, in the coupled condition of the both tubular couplings 9, 13, not only the first tubular coupling 9 but also the second tubular coupling 13 plus the oil supply hose 15 may be moved up and down, following the upward and downward movements of the roll.

According to this embodiment, by the simple operation to push a roll into a mill housing, the couplings for piping on the driving side may be automatically established, thereby dispensing with a need for an operator to go to the driving side, wherein there are provided the spindle 7 and spindle carrier 8, with the result of the achievement of a shortened roll-exchange time.

Figure 7:
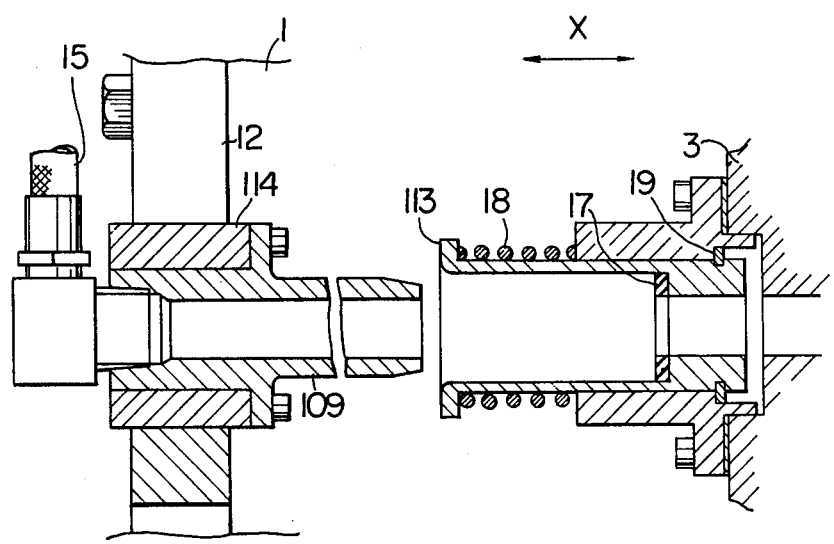
FIG. 7 is a cross-sectional view showing another embodiment of the invention in a condition similar to that shown in FIG. 5.

FIG. 7 shows an embodiment wherein the first and second tubular couplings 9, 13 are inverted positionally. A tubular coupling 113 on the female side, which is communicated with the fluid passage 6, is slidably attached to the roll chock 3 for a roll, through the medium of a flange member. The tubular coupling 113 is spring-loaded so as to be biased by means of a spring 18 in the direction opposite to the side of the roll chock 3 for a roll. The male tubular coupling 109, which is provided on the side of the guide 12 has its outer end connected to the lubricating oil supply hose 15, and is secured to the slider 114, so that the tubular coupling 109 may be moved up and down within the guide 12.

Figure 8:
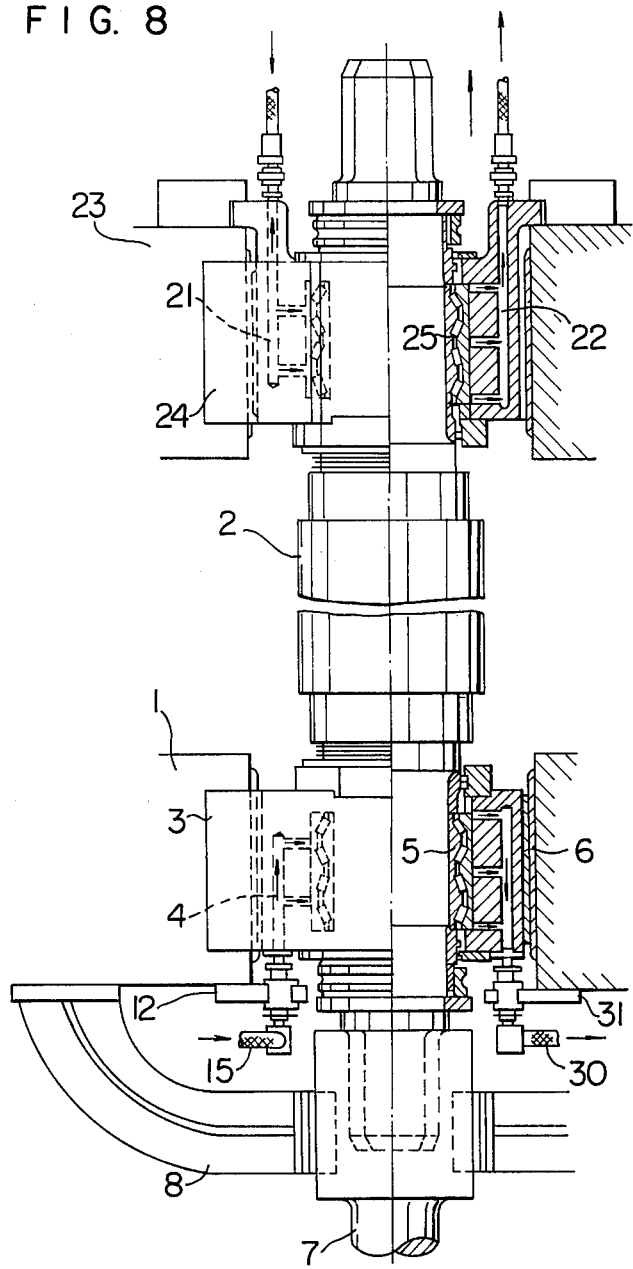
FIGS. 8 to 11 are plan views showing a modification of couplings for piping in bearing-portions for rolls chock on both the driving side and the driven side.
Figure 9:
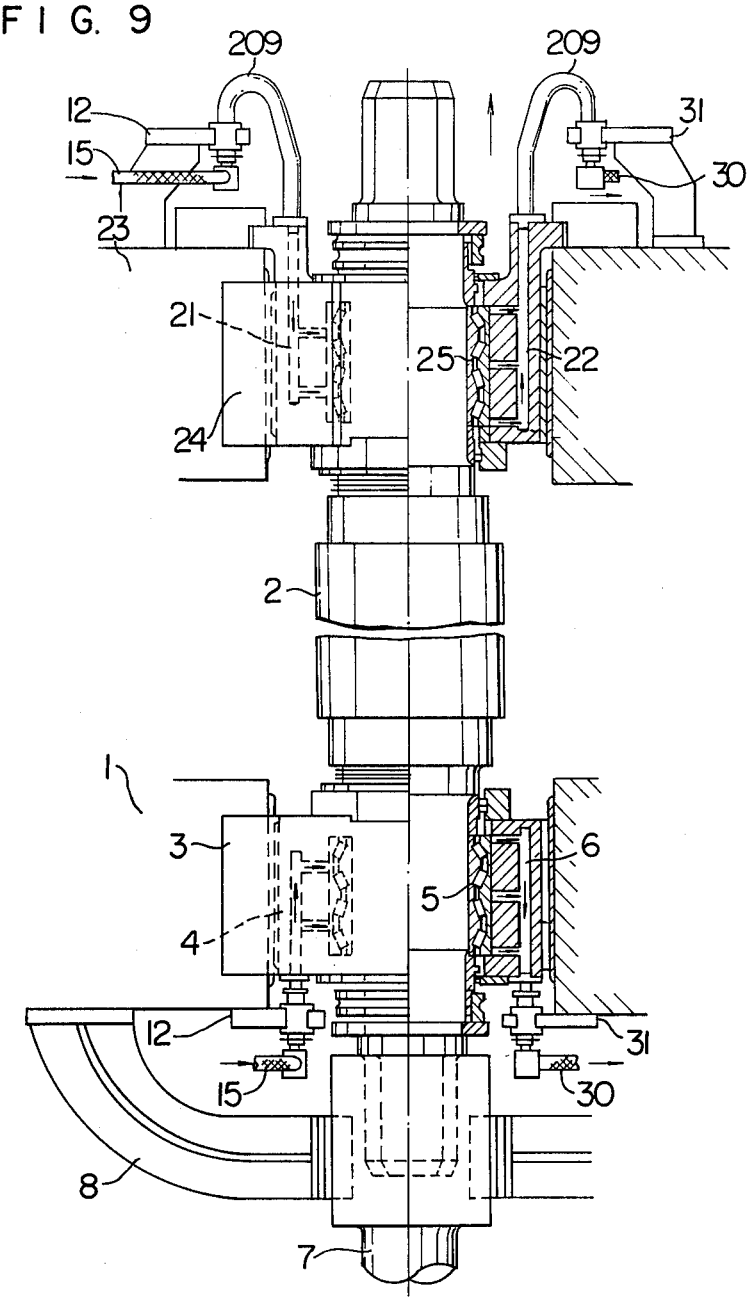
Figure 10:
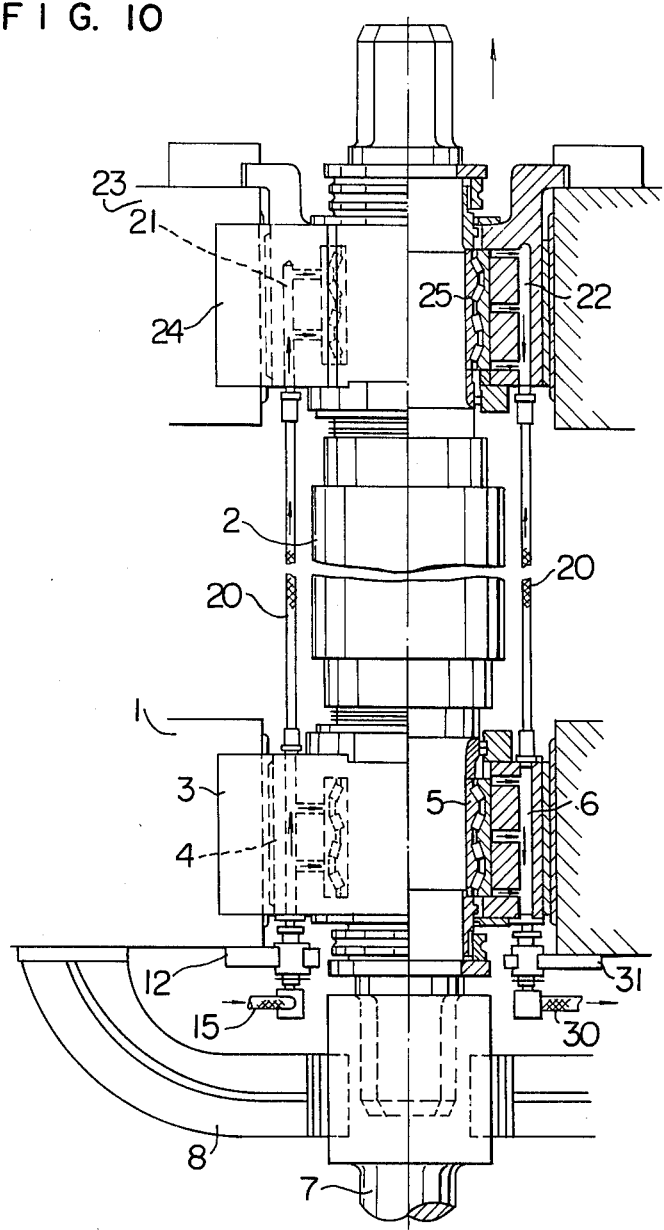

While the couplings provided on the driving side are shown, the present invention is by no means limited to the above instance, but may be applied to embodiments shown in FIGS. 8 to 11. FIG. 8 shows an embodiment including tubular couplings on the driving side, while quick couplings manually attachable and removable are provided on the driven side. FIG. 9 shows an embodiment, wherein the aforesaid tubular couplings manually attachable and removable are provided on the driving and driven sides, while the couplings on the driven side include a male tubular coupling 209 extending in a 'U' shape. FIG. 10 shows an embodiment, wherein a fluid passage 6 in the bearing portion 4 for a roll chock is connected to a fluid passage 22 in a bearing-portion 21 for a roll chock by a flexible hose 20. Shown at 23 is a mill housing on the driven side, at 24 a roll chock, and at 25 a bearing, respectively. According to this embodiment, by the simple operation to push the roll 2 into the housing in a proper position, the piping may be coupled not only on the driving side but also on the driven side, without resorting to the manual operation, thus enabling the complete automatic exchange of rolls.

Figure 11:
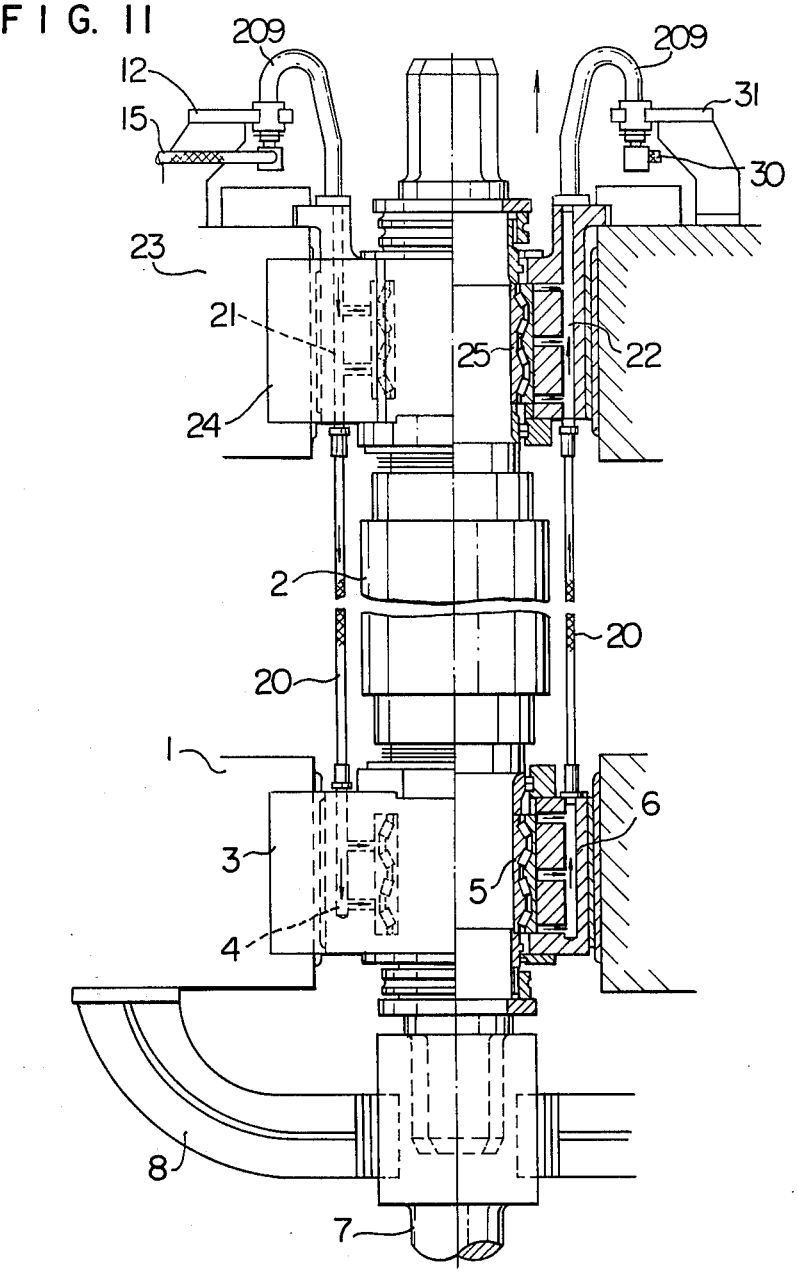

FIG. 11 shows an embodiment, wherein the aforesaid couplings manually attachable and removable are provided on the driven side, in addition to hoses 20 similar to those of FIG. 10.

Meanwhile, the flexible hoses 20 are used as means for communicating the both bearing portions with each other in this embodiment. However, other communicating means may be used.

As is apparent from the foregoing description of the couplings for piping according to the present invention a simple operation to push a roll into a mill housing allows the piping in a bearing portion for a roll chock, for supplying lubricating oil to a bearing, may be automatically coupled, with the resulting automated exchange of rolls.

I claim:

1. A coupling device of oil feeding pipe for rolling mill housing a roll assembly composed of a roll rotatably supported by a pair of roll chocks on driving and driven side of said rolling mill and a mill housing in which said roll assembly being built and exchangeable in axial direction of said roll comprising;

a tubular coupling having a pair of tubular members provided at least one of driving and driven side being in liquid sealing engagement to supply and exhaust lubricating oil to and from said roll chocks, one of said tubular member provided on said roll chock and the other provided on a guide member slidably mounted on said mill housing in such a manner that said tubular members are capable to move in response to vertical movement of said roll assembly, and said tubular member coaxially positioned to couple upon exchange of said roll assembly.

2. The coupling device as set forth in claim 1, wherein said tubular coupling are provided on driving side of said rolling mill and a coupling device manually attachable and removable are provided on driven side of said rolling mill.

3. The coupling device as set forth in claim 1, wherein said tubular couplings are provided on either driving and driven side of said rolling mill.

4. The coupling device as set forth in claim 1 further comprising a means to liquidly connect said pair of roll chocks of both driving and driven side.

5. The coupling device as set forth in claim 1, wherein said tubular members comprising of a female tubular member and a male tubular member inserted in said female tubular member when coupled, and said female tubular member being hold slidably in axial direction of said roll within a slider mounted on said guide member, and a spring member provided between said slider and said female tubular so as to bias said female tubular member toward said male tubular member.

6. The coupling device as set forth in claim 5, wherein said tubular coupling are provided on driving side of said rolling mill and a coupling device manually attachable and removable are provided on driven side of said rolling mill.

7. The coupling device as set forth in claim 5, wherein said tubular couplings are provided on either driving and driven side of said rolling mill.

8. The coupling device as set forth in claim 5 further comprising a means to liquidly connect said pair of roll chocks of both driving and driven side.

9. The coupling device as set forth in claim 1, wherein said tubular members comprising of a female tubular member and a male tubular member inserted in said female tubular member when coupled, and said female tubular member being held slidably in axial direction of said roll within a slider mounted on said roll chock, and a spring member provided between said slider and said female tubular member so as to bias, said female tubular member toward said male tubular member.

10. The coupling device as set forth in claim 9, wherein said tubular coupling are provided on driving side of said rolling mill and a coupling device manually attachable and removable are provided on driven side of said rolling mill.

11. The coupling device as set forth in claim 9, wherein said tubular couplings are provided on either driving and driven side of said rolling mill.

12. The coupling device as set forth in claim 9 further comprising a means to liquidly connect said pair of roll chocks of both driving and driven side.

* * * * *